United States Patent [19]

Deki et al.

[11] Patent Number: 4,866,722

[45] Date of Patent: Sep. 12, 1989

[54] METAL VAPOR LASER DEVICE STABILIZING SYSTEM

[75] Inventors: Kyoichi Deki; Shinji Sugioka, both of Kakogawa; Masaki Yoshioka, Izumi; Hiroshige Hata, Himeji, all of Japan

[73] Assignee: Ushio Denki Kabushiki Kaisha, Tokyo, Japan

[21] Appl. No.: 250,514

[22] Filed: Sep. 29, 1988

[30] Foreign Application Priority Data

Mar. 25, 1988 [JP] Japan .................................. 63-69719

[51] Int. Cl.$^4$ ............................................. H01S 3/03
[52] U.S. Cl. ...................................... 372/33; 372/29; 372/34; 372/56
[58] Field of Search ..................... 372/33, 34, 56, 61, 372/29

[56] References Cited

U.S. PATENT DOCUMENTS

| | | | |
|---|---|---|---|
| 4,232,274 | 11/1980 | Tokudome et al. | 372/61 |
| 4,689,796 | 8/1987 | Wright | 372/33 |
| 4,701,925 | 10/1987 | Fuke et al. | 372/33 |

FOREIGN PATENT DOCUMENTS

| | | | |
|---|---|---|---|
| 0089394 | 8/1978 | Japan | 372/34 |
| 0207680 | 11/1984 | Japan | 372/33 |
| 0228691 | 10/1986 | Japan | 372/33 |

OTHER PUBLICATIONS

SPIE, vol. 741, Design of Optical Systems Incorporating Low Power Lasers, 1987, by M. W. Dowley and entitled "A Modern Helium Cadmium Laser-The Evolution of a Design".

*Primary Examiner*—William L. Sikes
*Assistant Examiner*—Xuân Thi Võ
*Attorney, Agent, or Firm*—Robert F. Ziems

[57] ABSTRACT

A metal vapor laser device which can generate laser oscillations stably even if the atmospheric temperature of a metal vapor laser tube thereof varies suddenly. The metal vapor laser device comprises a metal vapor laser tube having a metal tank in which a working metal is contained, a heater for heating the metal in the metal tank, a power source circuit for the heater, a voltage detector for detecting an inter-electrode voltage of the laser tube, and a temperature detector for detecting an atmospheric temperature of the laser tube. The power source circuit includes a controlling circuit for controlling a power supply to the heater in response to detection signals from the voltage detector and the temperature detector to maintain the pressure of the metal vapor within the laser tube constant. When the atmospheric temperature of the laser tube varies suddenly, the operation of the heater is thus feed-forward controlled in response to the detection signal from the temperature detector.

2 Claims, 2 Drawing Sheets

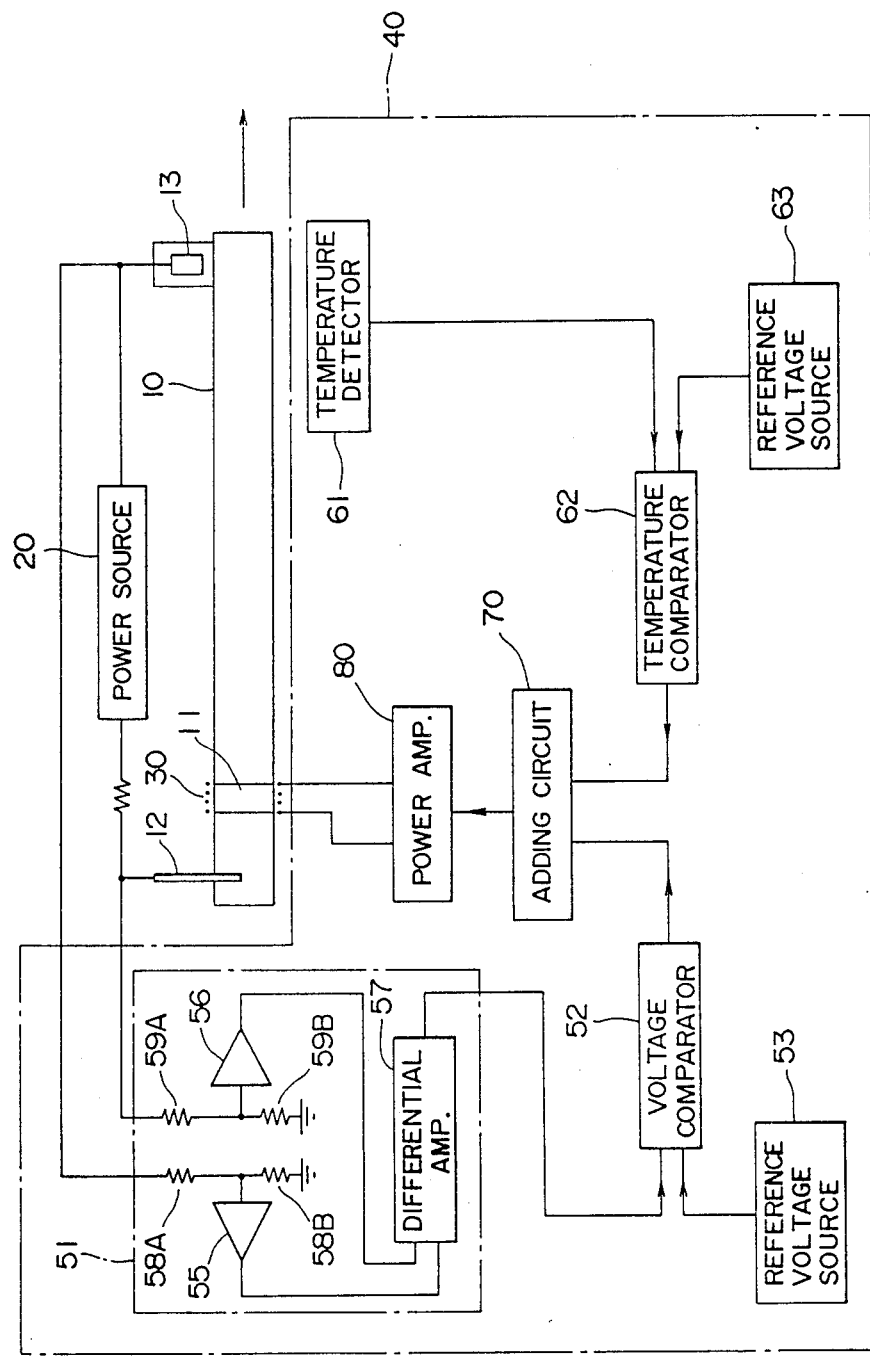
FIG. I

METAL VAPOR LASER DEVICE STABILIZING SYSTEM

BACKGROUND OF THE INVENTION

1. Field of the Invention

This invention relates to a metal vapor laser device.

2. Description of the Prior Art

A metal vapor laser device generates laser oscillations making use of vapor of a working metal which is enclosed in a laser tube together with a carrier gas.

An exemplary one of metal vapor laser devices which are practically used at present is a so-called positive column type metal vapor laser device which generates laser oscillations making use of a positive column portion of a discharge. More particularly, a positive column type He-Cd laser device is known wherein helium is used as a carrier gas and cadmium is used as a working metal.

Such a He-Cd laser device can continuously oscillate, for example, an ultraviolet ray having a wavelength of 325 nm as well as a visible ray having a wavelength of 442 nm in a short wavelength zone. Due to the characteristic, the demand for such He-Cd lasers has increased in recent years, and He-Cd laser devices are used in various fields as light sources, for example, for laser printers, holography, photo-plotters, color scanners and so on.

The output laser power of a metal vapor laser device depends upon a pressure of vapor of a working metal within a metal vapor laser tube of the laser device. Accordingly, in order to obtain a stable laser beam, commonly it is necessary to maintain the pressure of metal vapor within the metal vapor laser tube constant.

An exemplary one of conventional technical means for maintaining the pressure of metal vapor within a metal vapor laser tube constant takes advantage of the fact that, if the pressure of metal vapor within the metal vapor laser tube drops, then the inter-electrode voltage, that is, the voltage across the anode and the cathode, of the metal vapor laser tube rises. According to the conventional means, a variation of the inter-electrode voltage is detected, and such a detection signal is fed back to control the power supply to a heater for heating a working metal within a metal tank of the metal vapor laser tube.

The conventional means, however, has a drawback that the pressure of metal vapor within the laser tube cannot be maintained sufficiently constant because operation of the heater is feedback controlled in response to an inter-electrode voltage of the metal vapor laser tube. In particular, if the atmospheric temperature of the metal vapor laser tube varies suddenly, then a significantly long interval of time is required until such a variation in temperature is detected as an inter-electrode voltage because the speed of response of a variation in pressure of metal vapor to a variation of the atmospheric temperature is low. Accordingly, the means of feedback controlling the operation of the heater in response to a detected variation of the inter-electrode voltage of the metal vapor laser tube will present a considerable delay in time until the variation in pressure of metal vapor caused by a variation in temperature is compensated for. After all, quick control is difficult, and a stable laser beam cannot be produced.

SUMMARY OF THE INVENTION

It is an object of the present invention to provide a metal vapor laser device which can generate laser oscillations stably even if the atmospheric temperature of a metal vapor laser tube thereof varies suddenly.

In order to attain the object, according to the present invention, a metal vapor laser device of the type which includes a metal vapor laser tube having a metal tank in which a metal is contained, a heater for heating the metal in the metal tank, and a power source circuit for the heater, comprises a voltage detector for detecting an inter-electrode voltage of the metal vapor laser tube, and a temperature detector for detecting an atmospheric temperature of the metal vapor laser tube, the power source circuit including a controlling circuit for controlling a power supply to the heater in response to detection signals from the voltage detector and the temperature detector to maintain the pressure of vapor of the metal within the metal vapor laser tube constant.

With the metal vapor laser device according to the present invention, due to provision of the controlling circuit for controlling the power supply to the heater for heating the metal in the metal tank in response to detection signals from both of the voltage detector and the temperature detector to stabilize the pressure of metal vapor within the metal vapor laser tube, in case the atmospheric temperature of the metal vapor laser tube varies suddenly, the operation of the heater for heating the metal within the metal tank is feed-forward controlled in response to the detection signal from the temperature detector. Accordingly, compensating control for a variation in atmospheric temperature can be achieved rapidly, and consequently the pressure of metal vapor within the metal vapor laser tube can be stabilized with a high degree of accuracy.

The above and other objects, features and advantage of the present invention will become apparent from the following description and the appended claims, taken in conjunction with the accompanying drawings.

BRIEF DESCRIPTION OF THE DRAWINGS

FIG. 1 is a block diagram showing a basic construction of a metal vapor laser device according to the present invention;

DESCRIPTION OF THE PREFERRED EMBODIMENT

Figure 3:
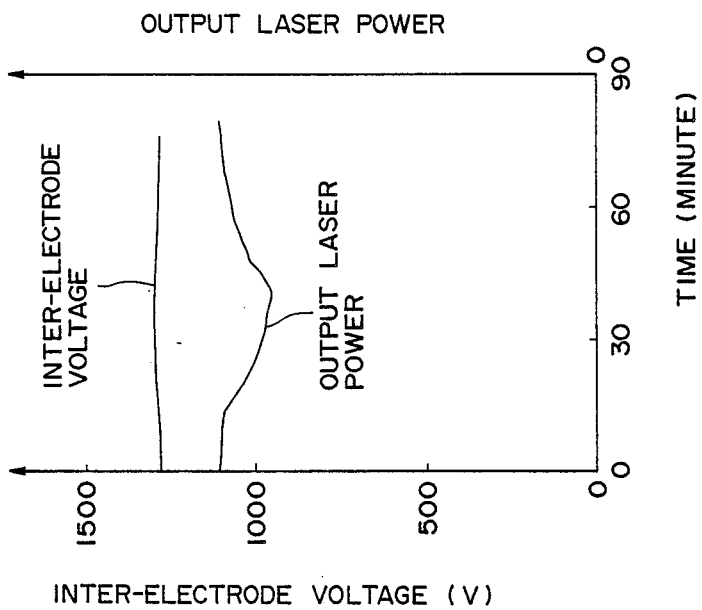
FIG. 3 is a similar view but illustrating variations of the output laser power and the inter-terminal voltage where detection of the atmospheric temperature is not involved.

Referring first to FIG. 1, there is shown a metal vapor laser device according to a preferred embodiment of the present invention. The metal vapor laser device shown includes a metal vapor laser tube 10 for oscillating, for example, a He-Cd laser beam. The metal vapor laser tube 10 may be composed, for example, of an enclosure tube in the form of a straight glass tube, a pair of metal disks provided at the opposite ends of the glass tube, and a pair of resonator mirrors provided at the opposite ends of the enclosure tube. The metal vapor laser tube 10 includes a metal tank 11 in the form of a metal tube section which forms part of the enclosure tube and in which a working metal such as a cadmium metal is contained. The metal vapor laser tube 10 has an anode 12 and a cathode 13 at opposite end portions of the enclosure tube. The metal vapor laser device further includes a laser oscillation power source circuit 20, a heater 30 wound on an outer periphery of the metal tank 11 for heating the metal within the metal tank 11, and a controlling circuit 40 for controlling the heater 30.

The heater controlling circuit 40 includes a voltage detector 51 for detecting an inter-electrode voltage of the metal vapor laser tube 10, that is, a voltage between the anode 12 and the cathode 13, a voltage comparator 52 connected to receive a detection signal from the voltage detector 51, a reference voltage source 53 for supplying a reference voltage to the voltage comparator 52, a temperature detector 61 for detecting an atmospheric temperature of the metal vapor laser tube 10, a temperature comparator 62 connected to receive a detection signal from the temperature detector 61, a reference voltage source 63 for supplying a reference voltage to the temperature comparator 62, an adding circuit 70 for adding a signal from the voltage comparator 52 and another signal from the temperature comparator 62, and a power amplifier 80 for supplying to the heater 30 a power which is controlled in response to a signal received from the adding circuit 70. The voltage detector 51 for detecting an inter-electrode voltage of the laser tube 10 includes a pair of buffer amplifiers 55 and 56, a differential amplifier 57, and two pairs of resistors 58A, 58B, 59A and 59B.

The controller circuit 40 composed of such components as described above controls power supply to the heater 30 in the following manner. In particular, when the inter-electrode voltage of the metal vapor laser tube 10 varies from a predetermined value while the atmospheric temperature of the metal vapor laser tube 10 remains unvaried, the variation of the inter-electrode voltage is detected by the voltage detector 51. Consequently, an output of such a level as to compensate for the variation is delivered from the voltage comparator 52 to the power amplifier 80 via the adding circuit 70 so that the power supply to the heater 30 is controlled in such a manner that the pressure of vapor of the metal within the metal vapor laser tube 10 may be adjusted to maintain the inter-electrode voltage at the predetermined constant value in a stable manner.

To the contrary, in case the atmospheric temperature of the metal vapor laser tube 10 varies suddenly, the temperature variation is detected by the temperature detector 61. Consequently, an output of such a level as to compensate for the variation is delivered from the temperature comparator 62 to the adding circuit 70 on which the output signal is added to a signal from the voltage comparator 52 to develop an addition signal. The additional signal is then coupled to the power amplifier 80 so that the power supply to the heater 30 is controlled in such a manner that the pressure of metal vapor within the metal vapor laser tube 10 may be maintained stably at a predetermined constant value. In this instance, the response to control by the voltage comparator 52 is slow because a certain interval of time is required until a variation in atmospheric temperature appears as a variation in inter-electrode voltage. Since the operation of the heater 30, however, is feed-forward controlled by the temperature comparator 62, the variation in pressure of the metal vapor within the metal vapor laser tube 10 is quickly compensated for against a variation in atmospheric temperature.

With the metal vapor laser device of the embodiment described above, the operation of the heater 30 for heating the metal within the metal tank 11 is feed-forward controlled, in addition to feedback control wherein the inter-electrode voltage of the metal vapor laser tube 10 serves as a control factor, in response to the atmospheric temperature of the metal vapor laser tube 10 serving as a control factor to control the pressure of metal vapor within the metal vapor laser tube 10. Accordingly, a variation of the pressure of the metal vapor can be compensated for sufficiently quickly against a sudden variation of the atmospheric temperature of the metal vapor laser tube 10, and accordingly, the pressure of the metal vapor within the metal vapor laser tube 10 can be stabilized at a predetermined constant value with a high degree of accuracy. Accordingly, a stabilized laser beam can be generated by the metal vapor laser device.

Figure 2:
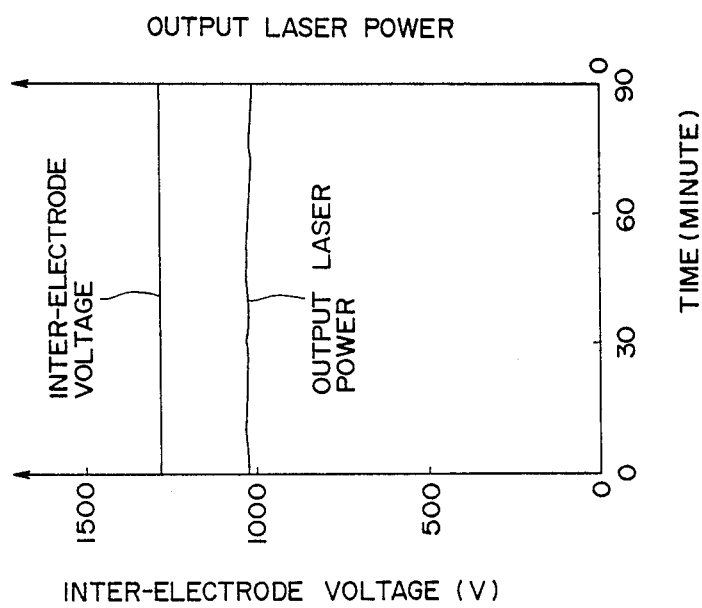
FIG. 2 is a diagram illustrating variations of the output laser power and the inter-terminal voltage of the metal vapor laser device of FIG. 1 when the atmospheric temperature varies.

FIGS. 2 and 3 illustrate results of experiments which have been conducted to prove effects of the present invention. In particular, a metal vapor laser device according to the present invention was constituted using a helium-cadmium laser tube wherein the laser head length is about 70 cm, the wavelength of an output laser beam is 442 nm, the laser output power is 10 to 30 mW and the power consumption is about 400 W. The metal vapor laser device was first rendered operative, and then the atmospheric temperature was lowered by 5° C. Resultant changes of the output laser power and the inter-electrode voltage were thus examined. The results are illustrated in FIG. 2.

As apparently seen from curves shown in FIG. 2, with the metal vapor laser device according to the present invention, a very stabilized output laser power is obtained while the atmospheric temperature presents a great change by 5° C. Further, it can be seen that also the inter-electrode voltage is stabilized against a variation in temperature. It is to be added that the maximum coefficient of variation of the output laser power was 1.3% and the maximum coefficient of variation of the inter-electrode voltage was 0.5%.

Meanwhile, using the same metal vapor laser device, an experiment was conducted in similar conditions except that the controlling circuit including the temperature detector is cut off from the metal vapor laser tube and thus rendered ineffective. The results are illustrated in FIG. 3.

As apparently seen from the curves of FIG. 3, where control over the atmospheric temperature by the temperature detector is not involved, a great variation appears in the output laser power with respect to a variation of the atmospheric temperature, and also the inter-electrode voltage exhibits a variation. It is to be added that the maximum coefficient of variation of the output laser power was 14.6%, and the maximum coefficient of variation of the inter-electrode voltage was 1.5%.

As may be recognized from the results of the experiments, with the metal vapor laser device according to the present invention, laser oscillations can be assured with a stabilized output power against a variation in atmospheric temperature. To the contrary, without feed-forward control of the atmospheric temperature, the variation of the output laser power is excessively great and stabilized laser oscillations cannot be assured.

While the present invention has been described hereinabove in connection with a preferred embodiment thereof, detailed construction of a controlling circuit for a heater is not limited to the specific one of the embodiment, and various alterations and modifications may be made to the controlling circuit. Also, detailed construction of a metal vapor laser tube is not limited to the specific one of the embodiment, and various alterations and modifications may be made to the metal vapor laser tube.

Besides, the working metal to be enclosed in the metal vapor laser tube is not limited to cadmium and may be any other suitable metal, and the carrier gas to be used in combination with the metal is not limited to helium gas and may be any other suitable gas.

What is claimed is:

1. A metal vapor laser device of the type which includes a metal vapor laser tube having, for example, an enclosure tube in the form of a straight glass tube, a pair of metal disks provided at the opposite ends of the glass tube, a pair of resonator mirrors provided at the opposite ends of the enclosure tube, an anode and a cathode at opposite end portions of the enclosure tube, a metal tank which forms part of the enclosure tube and in which a metal is contained, a heater for heating the metal in said metal tank, and a power source for said heater, comprising:

a voltage detector for detecting an inter-electrode voltage of said metal vapor laser tube; and a temperature detector for detecting an atmospheric temperature of said metal vapor laser tube;

said power source including a controlling circuit for controlling a power supply to said heater in response to detection signals from said voltage detector and said temperature detector to maintain the pressure of vapor of the metal within said metal vapor laser tube constant.

2. A metal vapor laser device as claimed in claim 1, wherein said controlling circuit includes a voltage comparator for comparing a detection signal from said voltage detector with a preset reference voltage, a temperature comparator for comparing a detection signal from said temperature detector with preset reference signal, and an adding circuit for adding a signal from said voltage comparator and another signal from said temperature comparator.

* * * * *